Dec. 21, 1965  A. U. BRYANT ETAL  3,224,080
VALVE CONSTRUCTION METHOD
Filed Oct. 21, 1964  3 Sheets-Sheet 1
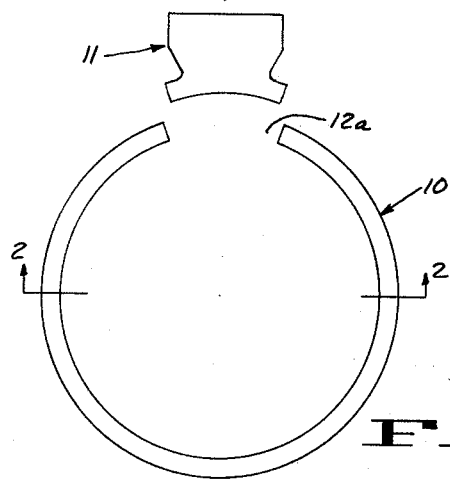
FIG-1-
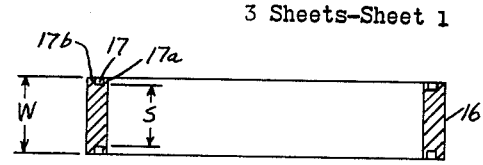
FIG-5-
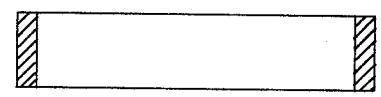
FIG-2-
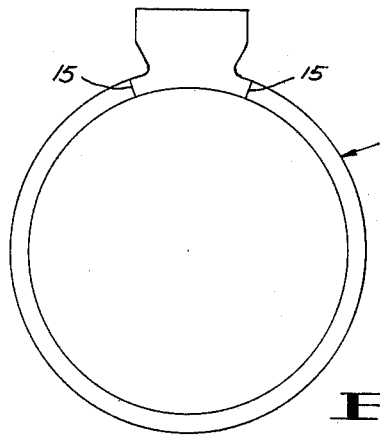
FIG-3-
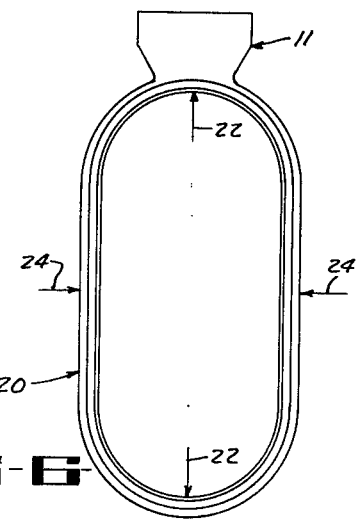
FIG-6-
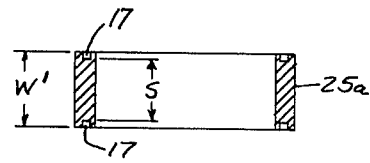
FIG-7-
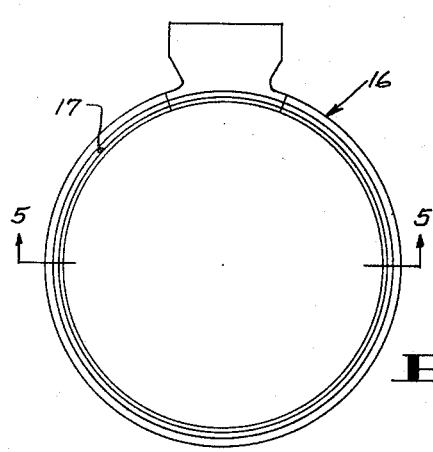
FIG-4-
INVENTOR.
AUSTIN U. BRYANT AND
LEO K. EDWARDE
BY Gregg and Stidham
ATTORNEY Dec. 21, 1965    A. U. BRYANT ETAL    3,224,080
VALVE CONSTRUCTION METHOD
Filed Oct. 21, 1964    3 Sheets-Sheet 2
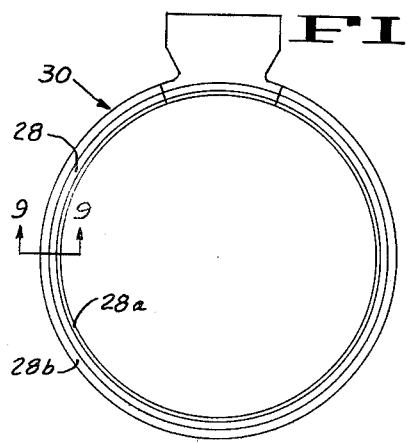
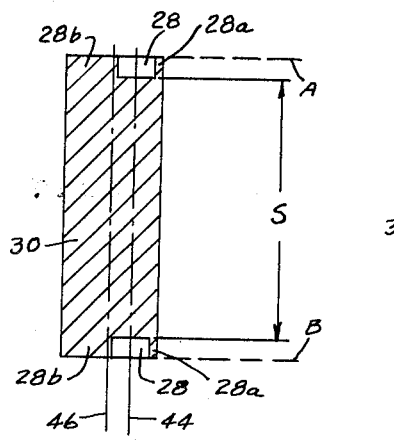
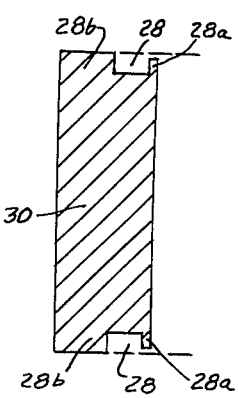
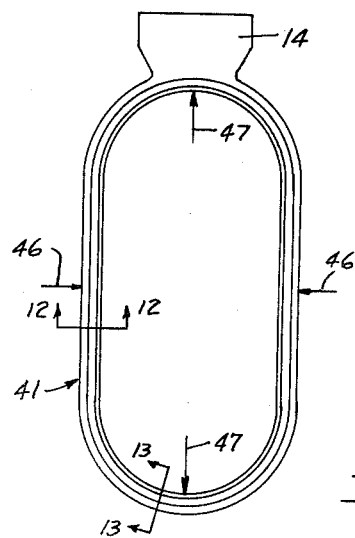
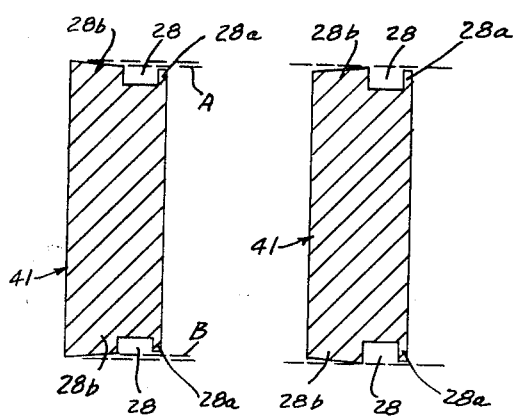
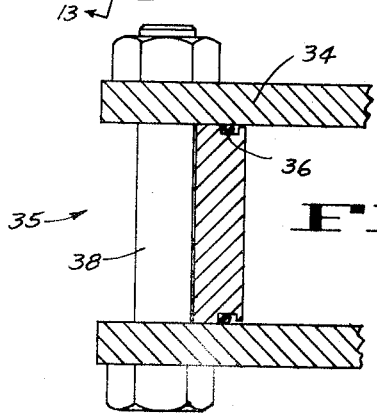
INVENTOR.
AUSTIN U. BRYANT AND
LEO K. EDWARDE
BY
Gregg and Stidham
ATTORNEY Dec. 21, 1965   A. U. BRYANT ETAL   3,224,080
VALVE CONSTRUCTION METHOD Filed Oct. 21, 1964   3 Sheets-Sheet 3

INVENTOR.
AUSTIN U. BRYANT AND
LEO K. EDWARDE
BY
*Gregg and Stidham*
ATTORNEY

United States Patent Office 3,224,080
Patented Dec. 21, 1965

3,224,080
VALVE CONSTRUCTION METHOD
Austin U. Bryant, Walnut Creek, and Leo K. Edwarde, Piedmont, Calif., assignors to Grove Valve and Regulator Company, Oakland, Calif., a corporation of California
Filed Oct. 21, 1964, Ser. No. 405,360
7 Claims. (Cl. 29—157.1)

This invention relates to a valve construction method and particularly to a novel method of making a body band that is secured between the end plates to form a three part gate valve body. This application is a continuation-in-part of our copending application Serial No. 87,571, filed February 7, 1961, for "Valve Construction" and now abandoned.

In the fabrication of valves and particularly gate valves of large size, it is frequently advantageous to form the body of a "sandwich" construction wherein an intermediate body band is clamped or otherwise secured between two end plates. When the three parts are secured together, they form an enclosure or body space within which the valve gate moves between a closed position wherein it is aligned with ports or flow passages in the end plates and an open position wherein the flow passages are cleared to permit flow through the valve. Hubs, flanges, or the like may be fixed to the end plates around the flow passages, to receive connecting pipes. Alternatively, stud bolts may be attached to the end plates to receive flanges of connecting pipes directly.

Valves of this character are often very large, for example, up to a 36″ in flow passage diameter, and they are often subjected to very high pressures. They are intended to control the flow of liquids and gasses such as liquid petroleum and products of natural gas.

In the fabrication of such valves, difficulties have been encountered, particularly in the formation of the body band which is preferably oval in configuration. Thus, the lower part of the oval is concentric with the flow passages while the upper part of the oval forms a recess for reception of the gate when it is in open position.

One method of forming the body band involves the provision of a metal plate as thick as the width of the body band from which a band of the desired oval shape is cut with a torch. Obviously, that method is extremely wasteful because much of the metal remaining is useful only as scrap. Moreover, the torch cutting operation leaves rough surfaces and edges which must be finished.

A further difficulty arises in those gate valves wherein the gate is raised and lowered by a stem, which in turn is operated by a hand wheel or other suitable means. Since the stem necessarily passes through the intermediate body band and is slidable or threaded therein, the body band must be of increased thickness in order to receive the stem and support the valve operating mechanism. Heretofore it has been a common practice to weld a bearing block to the oval intermediate body band, but this entails an additional operation. Further, the heat of the welding of this massive block in place causes distortion of the body band and requires extra finishing operations.

According to the preferred method of manufacturing intermediate body bands, we first provided a circular body ring and, after grooves are formed around each annular end face of the ring to accommodate resilient seal rings, we then deform the circular ring into the desired oval shape, with generally semi-circular ends joined by generally straight sides. However, when a circular body ring is deformed into an oval shape, its radius of curvature is reduced at the curved ends and increased substantially to infinity at the sides. Hence, the inner walls of the grooves at the curved ends are compressed to an increased height and the outer walls are under tension to reduce in height. This relationship is reversed on the straight sides, i.e., the outer walls increase in height and the inner walls shrink. As a result, the walls of the seal recesses may distort sufficiently to prevent sealing action of the seal ring accommodated therein.

It is, therefore, an object of this invention to form an oval body band from a circular band with preformed seal ring grooves without impairing the sealing characteristics.

A further object of this invention is the provision of an improved gate valve construction.

It is a further object of this invention to provide an improved method of fabricating the intermediate body part of a three-part gate valve body.

It is a further object of this invention to provide a method of fabricating an intermediate body band which is efficient and economical.

In accordance with one method of this invention, the intermediate valve body part is fabricated by providing a circular ring which, where a valve stem is to be employed, includes a bearing segment of added thickness which is welded into a gap provided in the circular band. Next, grooves are formed around each annular end face of the closed ring, with the groove bottoms a precise distance apart. The grooves are of a depth greater than that ultimately desired so that when the ring is formed into an oval-shaped band with resultant distortion, the annular end faces thereof are ground to plane surfaces with the depth of the grooves being reduced to that desired.

In accordance with another method of this invention, the grooves are formed in the circular band, again a predetermined distance apart but closer to the inner cylindrical surface. Hence, the outer wall of the recess is of greater thickness to form a bearing surface against which the end plates may be clamped. Then, the inner wall is reduced in height so that, even when enlarged by compression it will not extend above the outer wall. Then, after the band is deformed into its oval shape, the end plates may be clamped tightly to the body and conform to the slightly irregular thickness of the outer recess wall. The inner wall does not interfere and even though a gap occurs between inner wall and end plates around a portion of the band it is of no consequence since sealing under internal pressure is effected between the seal ring and the outer wall.

Other objects and advantages of our invention will become apparent from the description following when read in conjunction with the accompanying drawings wherein:

FIG. 1 is a front exploded view of the components of a ring prior to formation into the intermediate body band of a three part gate valve body, FIG. 2 is a section view taken along the line 2—2 of FIG. 1;

FIG. 3 is a front elevational view of the complete body ring before it has been grooved and shaped to a finished body band;

FIG. 4 is a front elevational view of the body ring of FIG. 3 after grooves have been formed in the end faces thereof;

FIG. 5 is a section view taken along line 5—5 of FIG. 4;

FIG. 6 is a front elevational view of an intermediate body band formed from the ring shown in FIG. 4;

FIG. 7 is a section view of a completed oval band after grinding of the end faces;

FIG. 8 is a front elevational view of another form of body ring prior to formation into an oval body band;

FIG. 9 is an enlarged section view taken along line 9—9 of FIG. 8;

FIG. 10 is a section view which is similar to FIG. 9, but showing the ring after the inner walls of the grooves have been cut down;

FIG. 11 is a front elevational view of an intermediate body band formed from the ring shown in FIG. 8;

FIG. 12 is a section view taken on line 12—12 of FIG. 11;

FIG. 13 is a section view taken on line 13—13 of FIG. 11;

FIG. 15 is a section view taken on line 15—15 of FIG. 14.

Figure 14:
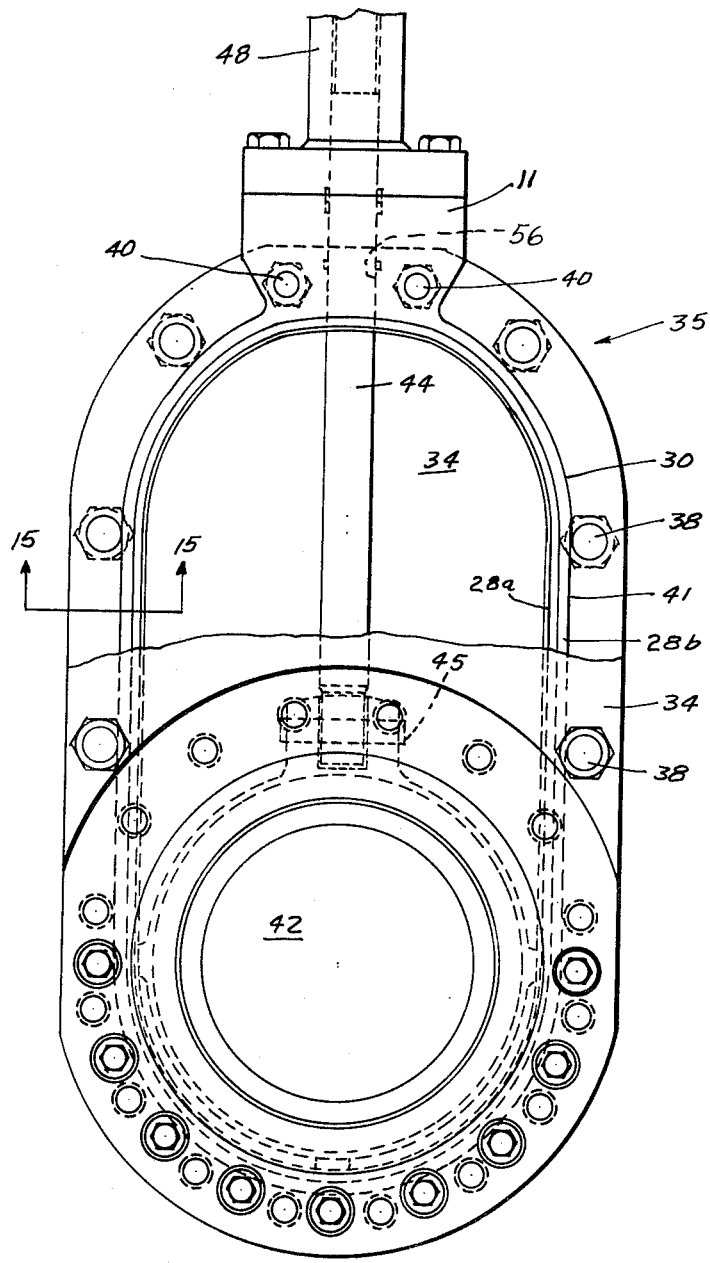
FIG. 14 is a front elevational view of a gate valve including as an element the intermediate body part shown in FIG. 11.

Referring now to FIG. 1, a partial body ring 10 of any suitable metal may be provided or formed, as by rolling. As shown in FIG. 1, a separate insert member 11 is formed with an arcuate bridge of metal which subtends the same angle as the gap 12a in the partial body ring 10. As shown in FIG. 3, the member 11 is inserted into the gap 12a to completely fill it and is secured by welds 15 to the ends of the partial body ring to form a complete body ring 16. If desired, the arcuate sector may have the same radius as the partial body ring 10, or it may be flattened along its inner face. Also, it may be shorter than the gap if weld metal is inserted.

The parallel edges or end faces of the circular body ring 16 are then formed with grooves 17 (FIGS. 4 and 5) such grooves being for the purpose of receiving annular seal members such as resilient O-rings. The grooves 17 are formed so that the spacing S (FIG. 5) between the bottom of the grooves is precise, i.e., a predetermined spaced distance apart. However, the width W of the ring is larger than ultimately desired and, hence, the inner and outer side walls 17a and 17b (i.e., the depth of the groove) are oversize. In accordance with one method of this invention, these side walls subsequently are reduced in depth by grinding so that the grooves have a precise depth.

After the grooves 17 are formed in the annular end faces of the circular body ring 16 (FIGS. 4 and 5), the ring is distorted into the generally oval body band 20 shown in FIG. 6. Any suitable means may be employed to form the oval shape, such as a combination of pulling and pushing dies (not shown) operated in the direction of the arrows 22 and 24, respectively. It should be noted that, while we have shown a stem accommodating bearing block 11, such block would not be included where the valve is to be operated by a lever which is pivoted in a valve end plate.

As previously described, the grooves 17 of the body ring 16 are formed with their bottom surfaces precisely spaced S and, in accordance with one method of the invention, the side walls 17a and 17b of the grooves are initially formed oversize. Then, after the ring is distorted into the oval body part 20 the faces of the band are ground to form planar faces and as a result the depths of the grooves 17 are precise in relation to the diameters of the O-ring seals which are to be inserted. In other words, the grooves are initially formed oversize in order to allow for distortion and subsequent finishing to the width W' (FIG. 7).

When a circular body ring 16 such as that shown in FIG. 4 is deformed into the oval shape shown in FIG. 6, the radially inner portion of the band at the curved ends is compressed to increase in cross-section and the outer portion is stretched to decrease in cross-section. Hence, the inner groove walls 17a are reduced. This relationship is reversed on the straight sides because of reverse bending, i.e., straightening. Hence, at the sides, the outer walls 17b increase in height and the inner walls 17a shrink. In accordance with another form of our invention illustrated in FIGS. 8 to 13 we overcame this defect by cutting the grooves 28 in the circular ring 30 so that the inner walls 28a of the grooves are shorter and thinner than the outer walls 28b. Thus, viewing the enlarged sections in FIGS. 9 and 10 it will be noted that the seal ring groove 28 is cut on a circle of a diameter smaller than that of the neutral axis of the ring so that the inner wall 28a is of smaller radial dimension than the outer wall 28b. Assuming that the circular end faces of the ring lie in the planes A and B the grooves are cut to the desired depth so that their bottoms are spaced apart the precise distance S. Then, the inner walls 28a are cut down, as shown in FIG. 10 between the planes A and B a distance at least as great as the calculated maximum height increase to be caused by compression as previously discussed. Then the ring is distorted to the oval configuration by application of pushing and pulling forces in the direction of arrows 46 and 47, respectively, shown in FIG. 11, the oval-shaped ring being designated by the reference character 41 in FIG. 11.

Referring now to FIGS. 12 and 13 the effects of such deformation will readily become apparent. FIG. 12 is a section taken through the straight sides, shows that the inner walls 28a shrink in height and the outer walls 28b increase in height as a result of tension and compression forces, respectively. Conversely it will be noted in FIG. 13 that this relationship is reversed at the curved ends where the radius of the band is reduced. That is, the outer walls 28b are reduced in height, and the inner walls 28a are increased in height, but not outside the planes A and B. In FIGS. 12 and 13 the dimensional changes are shown greatly exaggerated for clarity of illustration but the general relationship will be apparent. Since inner walls 28a in the circular body ring are cut down an amount greater than the ultimate increase in height due to expansion under compression, the outer walls 28b are at all points around the oval band wider than the inner walls so that the end plates 34 of the valve 35 (FIGS. 14 and 15) will seat against the wide outer walls 28b of the intermediate body band 41 instead of the narrow end faces of the inner walls 28a. The reduced height inner walls 28a of the grooves are adequate to retain the seal rings 36 during assembly, and when the valve is in use and under pressure they perform little function since the resilient seal rings are pressed against the outer walls 28b of the grooves.

It will be apparent that as a result of the deformation from round to oval shape, the wide outer end faces of the walls 28b upon which the end plates of the valve seat are transformed from flat parallel surfaces to slightly undulating surfaces. However, this distortion is not excessive and the valve body end plates 34, can easily accommodate themselves under clamping pressure to the slightly undulating surface of the outer walls 28b. This problem is simplified by reason of the fact that the outer walls do not have to accommodate the oppositely distorted inner wall 28a. Consequently, the intermediate body band 41 thus formed is in condition for use in a valve construction without subsequent grinding or machining. This is a distinct advantage since a very difficult grinding operation is eliminated.

In the completed valve 35 shown in FIG. 14, only the two uppermost bolts 40 engage the body band 41. The bolts 40 pass through holes drilled in the block 11 and the remainder of the bolts 38 are external to the body member 41 to clamp the end plates 34 firmly against the outer walls 28b on the body band 41. When so clamped the end plates tend to straighten the body band in the event it is twisted during fabrication.

The valve gate 42 may be operated by a stem 44 which is pinned to the gate at 45 and which extends slidably through a bore 56 in the bearing block 11. A yoke 48 is bolted to the block 11 and the upper end of the stem 44 is engaged by a suitable valve operator, such as a hand wheel (not shown) by which the stem and gate are raised and lowered.

This invention has been described in detail in conjunction with preferred embodiments thereof. However, it is apparent that many changes and modifications may be suggested to those skilled in this art without departing from the spirit and scope of the invention as defined by the appended claims.

Having described our invention, we claim:

1. A method of fabricating a valve body band comprising the steps of:
   providing a partial ring having a gap therein and a block with an arcuate portion thereon of a length and curvature substantially to fill said gap,
   inserting said block in said gap with the ends of said arcuate surface adjoining the ends of said partial ring,
   welding together the adjoining pairs of ends,
   forming a groove around each annular face of said closed ring to a depth greater than that ultimately desired,
   forming said closed ring into an oval-shaped band by longitudinally pulling and transversely pushing said closed ring, and
   then finishing said annular faces to reduce the depth of said grooves to that desired.

2. A method of forming the intermediate part of a valve body having two end plates and an elongated intermediate body band secured between said end plates, said method comprising the steps of:
   providing a metal ring of circular shape,
   forming a groove around each end face of the ring while it is in circular form,
   said grooves being formed with their bottom surfaces a predetermined distance apart and with the walls of the grooves oversize,
   deforming the grooved ring to the desired elongated shape, and thereafter
   grinding said end faces and reducing the walls of the grooves to their desired dimensions.

3. A method of forming the intermediate part of a valve body having two end plates and an elongated intermediate body band secured between said end plates, said method comprising the steps of:
   providing a metal ring of circular shape,
   forming a groove around each annular end face of the ring while it is in circular form, said grooves being formed with their bottom surfaces a predetermined distance apart and to a depth greater than that ultimately desired along at least portions of said annular end faces,
   forming the grooved ring to the desired elongated shape, and then finishing said annular faces to reduce the depth of said grooves to that desired.

4. A method of forming the intermediate part of a valve body having two end plates and an elongated intermediate body band secured between said end plates, said method comprising the steps of:
   providing a metal ring of circular shape with flat parallel end faces,
   forming a groove around each annular end face of the ring while it is in circular form, said grooves being formed adjacent the inner wall of the ring whereby wide outer and narrow inner groove walls are formed and with their bottom surfaces a predetermined distance apart,
   reducing the height of the narrow inner walls while the ring is in circular form, and then
   deforming said grooved ring into the desired elongated shape.

5. The method of claim 4 wherein:
   the narrow inner groove walls are reduced in height amount such that after the grooved ring is deformed into the desired elongated shape the maximum height of the narrow inner groove walls does not exceed the height of the wide outer groove walls at any point around the band.

6. A method of forming the intermediate part of a valve body having two end plates and an elongated intermediate body band secured between said end plates, said method comprising the steps of:
   providing a metal ring of circular shape with flat parallel end faces,
   forming a groove around each annular face of the ring while it is in circular form,
   each groove being of a depth approximately equal to that ultimately desired, said grooves being disposed toward the inner cylindrical surface of the ring whereby wide outer and narrow inner groove walls are formed adjacent the groove,
   reducing the height of the narrow inner groove walls while the ring is in circular form, and
   deforming said grooved ring into the desired elongated band with the end faces of the band outward of the grooves providing seats for the two end plates.

7. A method of forming the intermediate part of a valve body having two end plates and an elongated intermediate body band secured between said end plates, said method comprising the steps of:
   providing a metal ring of circular shape with flat parallel end faces,
   forming a groove around each annular end face of the ring while it is in circular form, said grooves being formed with outer and inner groove walls and with their bottom surfaces a predetermined distance apart,
   reducing the height of the inner walls while the ring is in circular form, and then
   deforming said grooved ring into the desired elongated shape.

References Cited by the Examiner

UNITED STATES PATENTS

| | | | |
|---|---|---|---|
| 3,013,770 | 12/1961 | Anderson et al. | 251—329 |
| 3,049,794 | 8/1962 | Bredtschneider | 29—157.1 |
| 3,069,132 | 12/1962 | Grove | 251—329 |
| 3,089,224 | 5/1963 | Grove | 29—157.1 |

WHITMORE A. WILTZ, *Primary Examiner.*

M. CARY NELSON, *Examiner.*